US012678688B1

(12) United States Patent
Yang

(10) Patent No.: US 12,678,688 B1
(45) Date of Patent: Jul. 14, 2026

(54) ROTATABLE AND ADJUSTABLE BRACKET FOR FIXING VR HANDLE

(71) Applicant: Chengdu Weisituo Technology Co., Ltd, Chengdu (CN)

(72) Inventor: Wenbin Yang, Chengdu (CN)

(73) Assignee: Chengdu Weisituo Technology Co., Ltd, Chengdu (CN)

( * ) Notice: Subject to any disclaimer, the term of this patent is extended or adjusted under 35 U.S.C. 154(b) by 0 days.

(21) Appl. No.: 19/456,203

(22) Filed: Jan. 22, 2026

(30) Foreign Application Priority Data

Oct. 21, 2025 (CN) .......................... 202522225408.5

(51) Int. Cl.
| | |
|---|---|
| *A63F 13/245* | (2014.01) |
| *A63F 13/837* | (2014.01) |
| *A63F 13/98* | (2014.01) |
| A63F 13/24 | (2014.01) |

(52) U.S. Cl.
CPC .......... *A63F 13/245* (2014.09); *A63F 13/837* (2014.09); *A63F 13/98* (2014.09); *A63F 13/24* (2014.09); *A63F 2300/1043* (2013.01); *A63F 2300/8082* (2013.01)

(58) Field of Classification Search
CPC ...... A63F 13/24; A63F 13/245; A63F 13/837; A63F 13/98; A63F 2300/1043; A63F 2300/8082
See application file for complete search history.

(56) References Cited

U.S. PATENT DOCUMENTS

| | | | | | |
|---|---|---|---|---|---|
| 4,630,823 | A | * | 12/1986 | Grant ...................... | A63F 13/24 |
| | | | | | 273/148 B |
| 5,207,791 | A | * | 5/1993 | Scherbarth ............. | F16M 11/00 |
| | | | | | 224/678 |
| 5,630,756 | A | * | 5/1997 | Thurston ................ | G05G 9/047 |
| | | | | | 345/161 |
| 5,655,736 | A | * | 8/1997 | Kozloff .................. | F16M 13/00 |
| | | | | | 248/181.2 |
| 6,688,571 | B1 | * | 2/2004 | Pauls ........................ | A61G 5/10 |
| | | | | | 248/282.1 |
| 11,325,030 | B2 | * | 5/2022 | Armand .................. | A63F 13/98 |
| 2021/0077912 | A1 | * | 3/2021 | Armand .................. | A63F 13/98 |
| 2022/0047940 | A1 | | 2/2022 | Armand | |

FOREIGN PATENT DOCUMENTS

| | | | | |
|---|---|---|---|---|
| CN | 219128262 | U | * | 6/2023 |
| CN | 223668620 | U | | 12/2025 |

* cited by examiner

*Primary Examiner* — Steven J Hylinski
(74) *Attorney, Agent, or Firm* — Birchwood IP

(57) ABSTRACT

Disclosed is a rotatable and adjustable bracket for fixing a VR controller, including a controller bracket and a connecting seat connected to a bottom of the controller bracket, where a bottom end of the connecting seat is connected to a VR controller gun mount body; a lower end of the controller bracket is provided with an arcuate groove, a fixing member is arranged through the arcuate groove, an upper portion of the fixing member is engaged with a locking member, the locking member is configured to lock a relative position between the fixing member and the controller bracket, and a lower end of the fixing member is connected to the connecting seat. Loosening the locking member allows the controller bracket to flexibly rotate around the support shaft, thereby adapting to angle requirements of different user hand sizes, grip habits, and VR shooting scenarios, and enabling convenient and reliable operation.

8 Claims, 4 Drawing Sheets

ROTATABLE AND ADJUSTABLE BRACKET FOR FIXING VR HANDLE

CROSS-REFERENCE TO RELATED APPLICATIONS

This application claims priority to Chinese Patent Application No. 202522225408.5, filed on Oct. 21, 2025, which is hereby incorporated by reference in its entirety.

TECHNICAL FIELD

The present application relates to the technical field of VR device accessories, and specifically to a rotatable and adjustable bracket for fixing a VR controller.

BACKGROUND

Virtual reality (VR) technology is an interactive technology that allows a user to experience an immersive environment by using a computer-generated simulated environment. VR shooting games are one of the most popular and promising VR games. However, due to a manner of gameplay, a player often encounters hand shaking and inability to perform accurate aiming when initially attempting VR shooting games. A VR controller gun mount can provide rigid support for a user, so that aiming in a game becomes easier.

However, in VR games, an orientation of a weapon used by a player follows an orientation of a VR controller. Different games have differences in mapping between an in-game weapon orientation and a controller orientation. Only when the in-game weapon orientation is adjusted to be consistent with an orientation of the VR controller gun mount can an optimal use experience be obtained. Such an adjustment requires a gun mount to be capable of adjusting a relative angle between a VR controller and a gun mount body.

However, existing VR controller gun mount products generally can only achieve angle adjustment of a controller in the X-axis and Y-axis directions. With respect to angle adjustment along a Z axis that most significantly affects the use experience, an appropriate solution has not been provided.

SUMMARY

To solve the foregoing technical problems, the present application provides a rotatable and adjustable bracket for fixing a VR controller.

A technical solution adopted by the present application for solving the foregoing technical problem is as follows. A rotatable and adjustable bracket for fixing a VR controller includes a controller bracket and a connecting seat connected to a bottom of the controller bracket, where a bottom end of the connecting seat is connected to a VR controller gun mount body, and the controller bracket is provided with a controller groove for placing the VR controller; and a lower end of the controller bracket is provided with an arcuate groove and a mounting hole, the controller bracket is slidable along the arcuate groove, a fixing member is arranged through the arcuate groove, an upper portion of the fixing member is engaged with a locking member, the locking member is configured to lock a relative position between the fixing member and the controller bracket, a lower end of the fixing member is connected to the connecting seat, a support shaft is arranged in the mounting hole, a lower end of the support shaft is connected to the connecting seat, and the controller bracket rotates around the support shaft as a center.

Further, a baffle is arranged at a bottom of the controller bracket and located on an inner side of the arcuate groove.

Further, the connecting seat includes a base and an upper seat magnetically connected to the base, and the controller bracket is connected to the upper seat in a mating manner.

Further, the connecting seat includes a connecting plate and a magnetic seat arranged on the connecting plate, the connecting plate is connected to a bottom of the controller bracket, and the magnetic seat is magnetically engaged with a VR controller gun mount body.

Further, an opening is formed on a side of the controller bracket, a position of the opening corresponds to a position of the arcuate groove, and the operation of the locking member is facilitated through the opening.

Further, a center of the arcuate groove is collinear with an axis of the support shaft.

Further, the fixing member and the support shaft are both bolts, and the locking member is a nut matching the bolts.

Further, an angular range of the arcuate groove is 0-60°.

The present application has the following beneficial effects: The rotatable and adjustable bracket for fixing a VR controller provided by the present application achieves stable connection between the controller bracket and the gun mount body through the connecting seat. A support shaft at an upper end of the connecting seat is movably connected to the controller bracket to form a precise rotation fulcrum. A fixing member arranged through the arcuate groove at a lower end of the controller bracket achieves trajectory guidance. Loosening the locking member allows the controller bracket to rotate flexibly around the support shaft, thereby adapting to angle requirements of different user hand sizes, grip habits, and VR shooting scenarios. After adjustment, tightening the locking member can quickly fix a position. A two-point support structure formed by the support shaft and the fixing member greatly improves connection rigidity, and avoids loosening and displacement after adjustment. The overall structure can accommodate diverse usage requirements without replacing components, so that both grip comfort and operational accuracy are enhanced, the adjustment process is simplified, and the product universality and reliability are improved.

Figure 1:
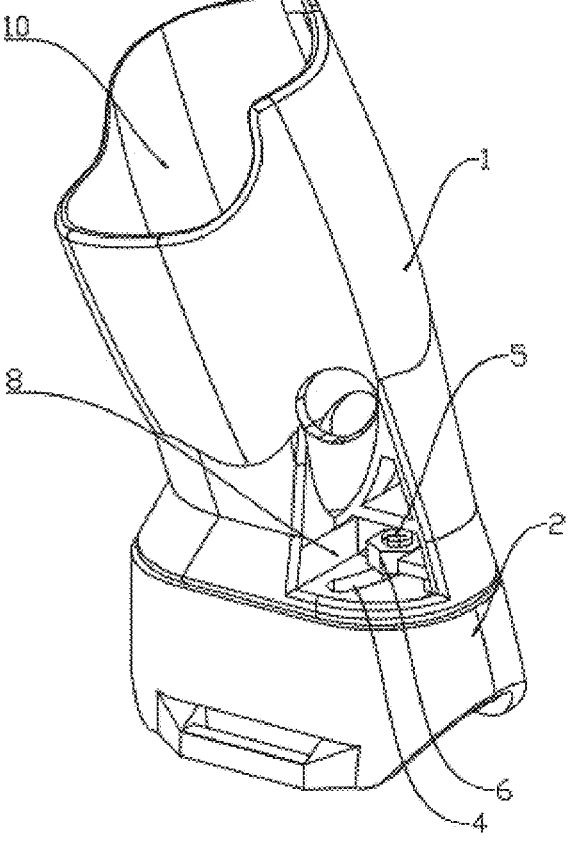
FIG. 1 is a schematic structural diagram of the present application.

Reference numerals: 1. controller bracket, 2. connecting seat, 3. VR controller gun mount body, 4. arcuate groove, 5. fixing member, 6. locking member, 7. support shaft, 8. opening, 9. VR controller, 10. controller groove, 11. baffle, 12. mounting hole, 20. base, 21. upper seat, 200. connecting plate, and 201. magnetic seat.

DESCRIPTION OF EMBODIMENTS

The principle and features of the present application are described below in conjunction with the accompanying drawings. The examples provided are only for explaining the present application and are not intended to limit the scope of the present application.

Figure 2:
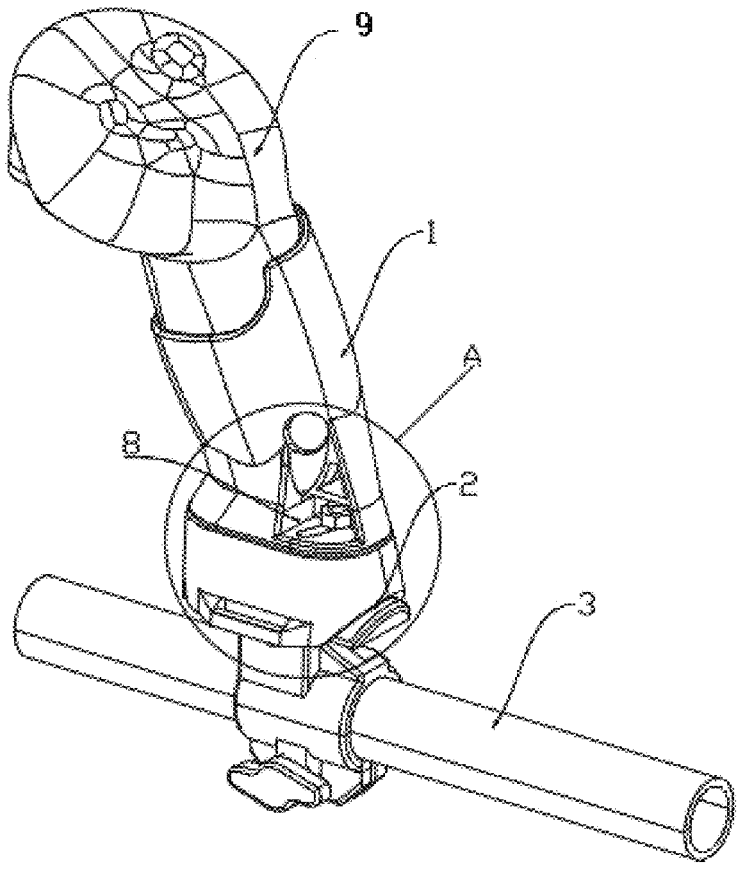
FIG. 2 is a schematic structural diagram of a usage state of the present application.
Figure 3:
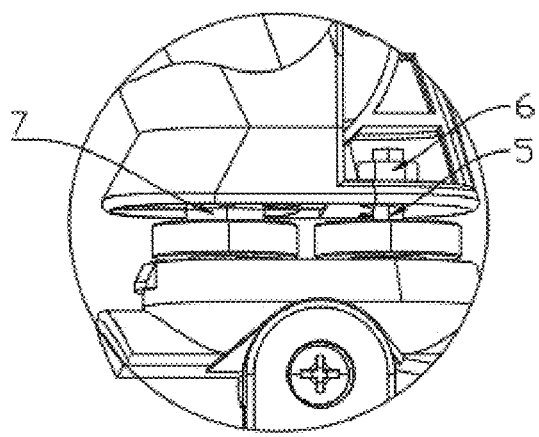
FIG. 3 is a schematic diagram of an enlarged structure at position A in FIG. 2.
Figure 4:
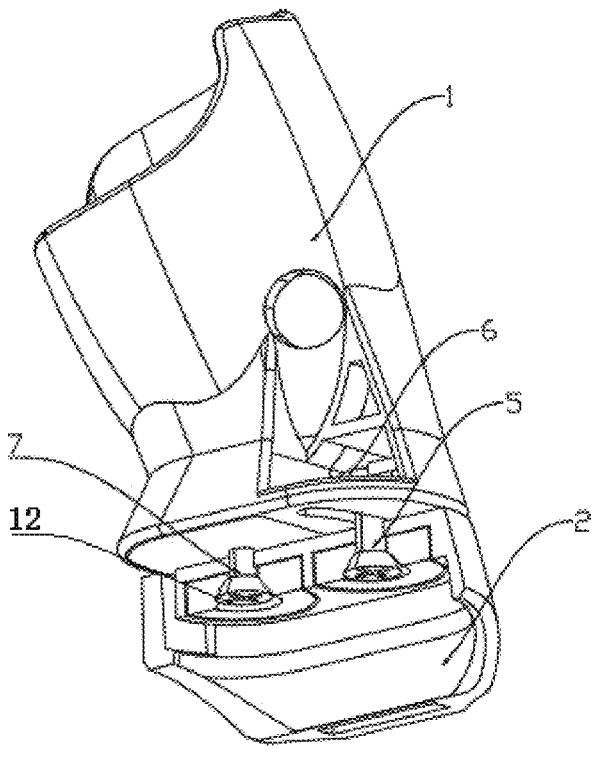
FIG. 4 is a partial sectional view of the present application.
Figure 5:
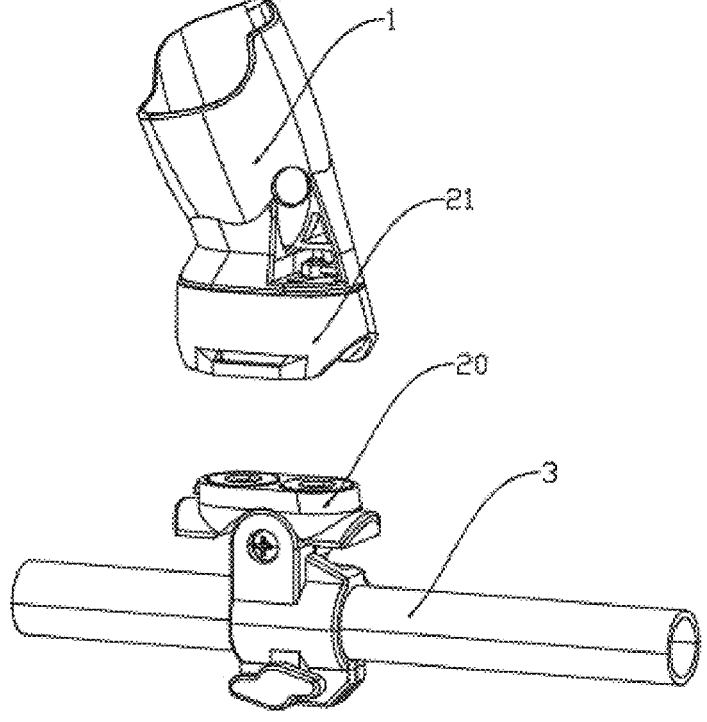
FIG. 5 is a schematic diagram I of a structure of a connecting seat according to the present application.
Figure 6:
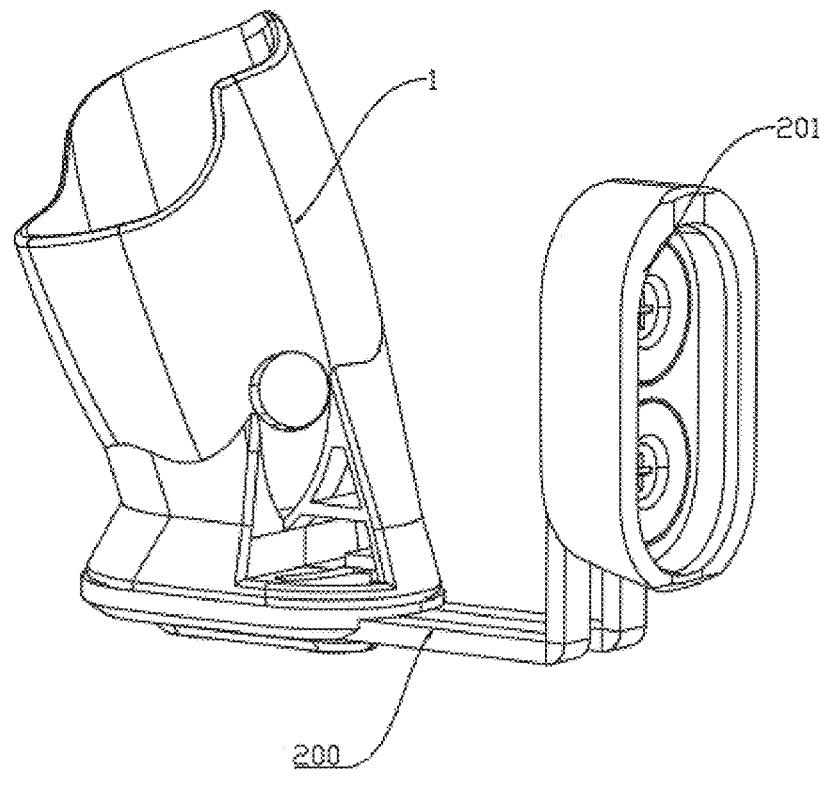
FIG. 6 is a schematic diagram II of a structure of a connecting seat according to the present application.
Figure 7:
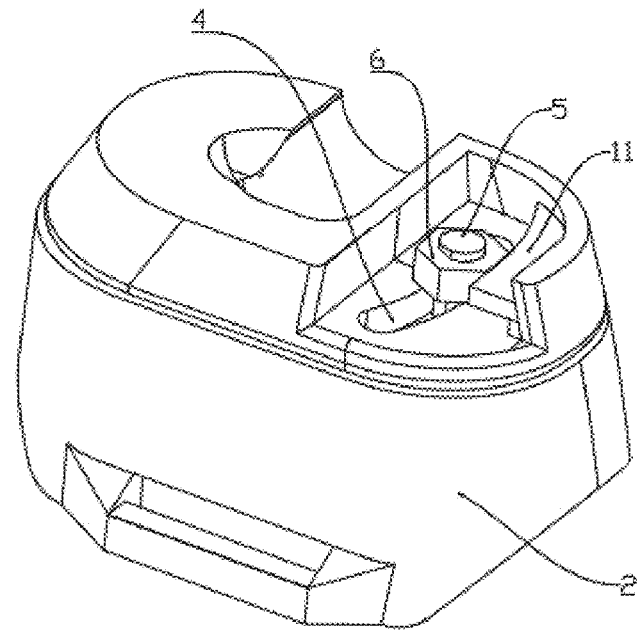
FIG. 7 is a schematic diagram of a structure of a baffle according to the present application.

As shown in FIG. 1 to FIG. 7, a rotatable and adjustable bracket for fixing a VR controller includes a controller bracket 1 and a connecting seat 2 connected to a bottom of the controller bracket 1, and a bottom end of the connecting seat 2 is connected to a VR controller gun mount body 3. The controller bracket 1 is a component directly gripped by a user. The shape and structure of the controller bracket 1 are adapted to a physiological structure of a hand to ensure grip comfort. The connecting seat 2, serving as a connecting component between the controller bracket 1 and the VR controller gun mount, provides connection between the two structures and transmits an operation force applied by the user on the controller to the gun mount body. The controller bracket 1 is provided with a controller groove 10 for placing a VR controller 9. The VR controller 9 may be inserted from an upper end of the controller groove 10 and fixed by the friction between inner walls of the controller groove 10.

A lower end of the controller bracket 1 is provided with an arcuate groove 4. Preferably, an angular range of the arcuate groove 4 is 0-60°, a fixing member 5 is arranged through the arcuate groove 4, an upper portion of the fixing member 5 is engaged with a locking member 6, the locking member 6 is configured to lock a relative position between the fixing member 5 and the controller bracket 1, and a lower end of the fixing member 5 is connected to the connecting seat 2. The arcuate groove 4 is a core trajectory component for achieving angle adjustment, and provides a slidable adjustment path for the fixing member 5. Preferably, the fixing member 5 is a bolt or a screw. The locking member 6 is a nut matching the fixing member 5. The fixing member 5 serves as a connecting structure between the controller bracket 1 and the connecting seat 2 to achieve mechanical linkage therebetween. In addition, the fixing member 5, also serving as a guiding structure in the arcuate channel, slides along a trajectory of the arcuate groove 4 during adjustment, and restricts a movement direction of the controller (allowing only planar rotation), so as to prevent displacement or shaking during adjustment. The locking member 6 generates a locking force through engagement (such as threaded engagement) with the fixing member 5, and forms rigid fixation among the controller bracket 1, the fixing member 5, and the connecting seat 2. This counteracts external forces during user gripping and operation, and prevents loosening of the adjusted angle.

When an angle of the controller needs to be adjusted, the locking member 6 is loosened. The pressure of the locking member 6 on the controller bracket 1 is released, and the controller bracket 1 can freely rotate around a rotation fulcrum. Since the fixing member 5 is arranged through the arcuate groove 4 and the fixing member 5 maintains a relative fixed position with the connecting seat 2, when the controller rotates, the arcuate groove 4 slides along a circular arc with a rotation fulcrum as a center along an axis of the fixing member 5, the fixing member 5 performs a trajectory limiting function to ensure that the controller can only perform planar rotation along a preset angular range, so that the displacement or shifting is avoided.

When the controller is adjusted to a target angle (such as adapting to a user gripping habit or a game scenario requirement), the locking member 6 is tightened, the locking member 6 and the fixing member 5 generate axial pressure through threaded engagement, the controller bracket 1 is tightly pressed against the connecting seat 2, and the static friction of contact surfaces is used to counteract external forces, so that the controller bracket 1 and the connecting seat 2 maintain a relative fixed position. In this case, a cooperation relationship between the arcuate groove 4 and the fixing member 5 is converted from sliding guidance to rigid positioning, thereby achieving stable locking of the adjusted angle.

In this embodiment, a lower end of the controller bracket 1 is provided with a mounting hole 12, a support shaft 7 is arranged in the mounting hole 12, a lower end of the support shaft 7 is connected to the connecting seat 2, and the controller bracket 1 rotates around the support shaft 7 as a center. A center of the arcuate groove 4 is collinear with an axis of the support shaft 7. Preferably, an active connection manner is clearance fit connection, an end of the support shaft 7 is designed as a cylindrical protruding shaft, a blind hole or a through hole matching the protruding shaft is formed at a corresponding position at a bottom of the controller bracket 1, the protruding shaft is inserted into the hole, and clearance fit is adopted between the protruding shaft and the hole to achieve rotation around an axis.

The support shaft 7 is a fixed fulcrum for achieving planar rotation movement of the controller bracket 1, and an end of the support shaft 7 away from the connecting seat 2 is movably connected to the controller bracket 1 to form a definite rotation axis, where the rotation axis is required to be collinear with a center of the arcuate groove 4 on the controller bracket 1, so as to ensure that the controller bracket 1 performs circular planar rotation along a preset trajectory of the arcuate groove 4 with the support shaft 7 as a center, to avoid the displacement, shaking, or unintended multidirectional movement during adjustment, which serves as a basis for angle adjustment accuracy. Preferably, the support shaft 7 may be a positioning pin or a screw.

During the use process, when the locking member 6 is loosened, the movable connection of the support shaft 7 allows the controller bracket 1 to freely rotate around the support shaft 7, and the angle adjustment is achieved in cooperation with the trajectory constraint of the arcuate groove 4. After the locking member 6 is tightened, the controller bracket 1, the fixing member 5, and the connecting seat 2 are rigidly fixed, and the support shaft 7 serves as an auxiliary fulcrum to further restrict slight shifting of the controller, thereby improving structural stability after locking.

In this embodiment, a baffle 11 is arranged at a bottom of the controller bracket 1 and located on an inner side of the arcuate groove 4. When the nut slides to an inner side of the arcuate groove 4, the baffle abuts against one edge of the nut to prevent rotation of the nut. When the nut slides to an outer open region, the nut can be directly pressed by a hand to prevent rotation of the nut. Thus, regardless of a position to which the nut rotates, the nut can be blocked, and a screw can be loosened from a bottom by using a screwdriver, so that an angle of the controller bracket can be adjusted more easily, and operational convenience is improved.

In addition, in the present application, the connecting seat has two structures, which are specifically as follows.

Embodiment 1: the connecting seat 2 includes a base 20 and an upper seat 21 magnetically connected to the base 20, and the controller bracket 1 is connected to the upper seat 21 in a mating manner.

Embodiment 2: the connecting seat 2 includes a connecting plate 200 and a magnetic seat 201 arranged on the connecting plate 200, the connecting plate 200 is connected to a bottom of the controller bracket 1, and the magnetic seat 201 is magnetically engaged with the VR controller gun mount body 3.

In this embodiment, an opening 8 is formed on a side of the controller bracket 1, a position of the opening 8 corresponds to a position of the arcuate groove 4, and the operation of the locking member 6 is facilitated through the opening 8. The side opening 8 corresponds to the position of the arcuate groove 4, which directly exposes an operation portion of the nut, provides sufficient insertion space and visual field for a hand or a tool, and allows a user to quickly complete an entire operation process of loosening the nut, adjusting an angle, and tightening the nut without disassembling the controller and without adjusting a gripping posture, so that the adjustment convenience is improved. An edge of the opening 8 is designed with a rounded corner or provided with anti-slip protrusions, so that hand injury during operation is avoided. In addition, the opening 8 is coaxial with the arcuate groove 4 or slightly wider than the arcuate groove 4, which ensures that the nut is covered by the opening 8 over an entire adjustment range of the arcuate groove 4, so that the nut is operable through the opening 8 at any rotation angle of the controller, without any adjustment blind area, and reliable operation is achieved.

In addition, it should be noted that components not described in detail herein belong to the prior art.

The above mentioned contents are only preferred embodiments of the present application and are not intended to limit the present application. Any modification, equivalent substitution, improvement and the like made within the spirit and principle of the present application shall all fall within the scope of protection of the present application.

What is claimed is:

1. A rotatable and adjustable bracket for fixing a VR controller, comprising a controller bracket and a connecting seat connected to a bottom of the controller bracket, wherein a bottom end of the connecting seat is connected to a VR controller gun mount body, and the controller bracket is provided with a controller groove for placing the VR controller; and a lower end of the controller bracket is provided with an arcuate groove and a mounting hole, the controller bracket is slidable along the arcuate groove, a fixing member is arranged through the arcuate groove, an upper portion of the fixing member is engaged with a locking member, the locking member is configured to lock a relative position between the fixing member and the controller bracket, a lower end of the fixing member is connected to the connecting seat, a support shaft is arranged in the mounting hole, a lower end of the support shaft is connected to the connecting seat, and the controller bracket rotates around the support shaft as a center.

2. The rotatable and adjustable bracket for fixing a VR controller according to claim 1, wherein a baffle is arranged at a bottom of the controller bracket and located on an inner side of the arcuate groove.

3. The rotatable and adjustable bracket for fixing a VR controller according to claim 1, wherein the connecting seat comprises a base and an upper seat magnetically connected to the base, and the controller bracket is connected to the upper seat in a mating manner.

4. The rotatable and adjustable bracket for fixing a VR controller according to claim 1, wherein the connecting seat comprises a connecting plate and a magnetic seat arranged on the connecting plate, the connecting plate is connected to a bottom of the controller bracket, and the magnetic seat is magnetically engaged with a VR controller gun mount body.

5. The rotatable and adjustable bracket for fixing a VR controller according to claim 1, wherein an opening is formed on a side of the controller bracket, a position of the opening corresponds to a position of the arcuate groove, and operation of the locking member is facilitated through the opening.

6. The rotatable and adjustable bracket for fixing a VR controller according to claim 1, wherein a center of the arcuate groove is collinear with an axis of the support shaft.

7. The rotatable and adjustable bracket for fixing a VR controller according to claim 1, wherein the fixing member and the support shaft are both bolts, and the locking member is a nut matching the bolts.

8. The rotatable and adjustable bracket for fixing a VR controller according to claim 1, wherein an angular range of the arcuate groove is 0-60°.

* * * * *